June 4, 1957   C. R. SACCHINI ET AL   2,794,524
SPRING CLUTCH MECHANISMS
Filed Sept. 1, 1954

INVENTORS
C. R. SACCHINI
D. R. TOMKO
BY
ATTORNEY

United States Patent Office 2,794,524
Patented June 4, 1957

2,794,524
SPRING CLUTCH MECHANISMS

Columbus R. Sacchini, Willoughby, and Donald R. Tomko, Cleveland, Ohio, assignors, by mesne assignments, to Curtiss-Wright Corporation, Marquette Metal Products Division, Cleveland, Ohio, a corporation of Delaware Application September 1, 1954, Serial No. 453,482

7 Claims. (Cl. 192—48)

The invention relates to improvements in torque transmitting couplings of the type employing a coil clutch (commonly called a spring clutch), wherein one terminal member of the coupling, has a helical friction member or clutch spring anchored to it, and the opposite terminal member has a drum against which "free end" coils of the helical member wrap, either inwardly toward the common axis of the spring and drum or outwardly away from such axis, depending upon whether the drum surfaces are external or internal.

Couplings of the type identified above and as usually designed are inherently capable of transmitting substantial amounts of torque in one rotational direction only; and resistance of the load to being turned (load resistance torque) is usually depended upon to furnish or maintain so called "energizing" force on the clutch spring, i. e. force operative or capable of operating to maintain the spring continuously in tight contact with its drum or drums. In some types of service the couplings are subjected, at least in effect to rapidly recurrent or cyclic torque reversals during successive rotations, allowing intermittent overrun during operation. In such cases, particularly if the speeds and loads are relatively high, frictionally engaged surfaces of the coils and/or drums prematurely become seriously damaged. When a spring clutch as generally illustrated herewith (but without the present subject improvement) is used as a one-to-one ratio externally controllable or actuatable coupling between an automobile engine and a two cylinder, reciprocating piston, gas compressor the above outlined type of damage tends to occur, probably due to the fact that the compressor behaves as though it were an engine twice for each full turn of its crank shaft, thus causing or allowing intermittent or cyclic overrun, hence (assuming fairly high speed of operation) very rapidly recurrent or cyclic release and percussive lockup action by the clutch spring. The above discussion indicates the principal object of the present invention.

A specific object is to provide, in a coil or spring clutch mechanism, a centrifugally acting means operative to restrain the clutch spring from movement out of locking position on its drum or drums so long as the speed of operation of the mechanism is above a predetermined magnitude, and which means, during operation at lower speeds or standstill, will automatically free the clutch spring from such restraint to enable effectual selective control of the clutch by suitable actuating means.

Other objects of the invention will become apparent from the following description of two exemplary forms thereof shown in the drawings, wherein.

Figures 1, 2, 3, 4:
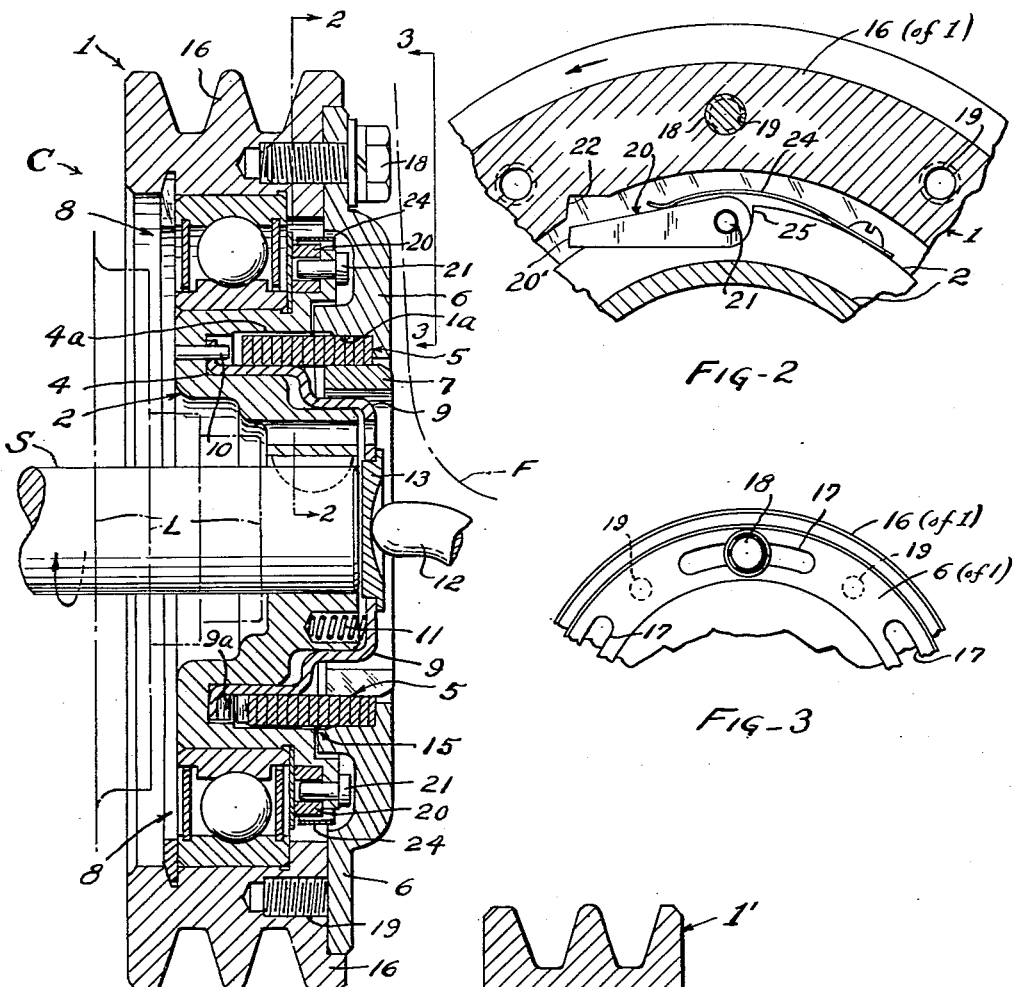
Fig. 1 is a central longitudinal, full scale sectional view of the clutch mechanism assembly in one form.
Fig. 2 is a fragmentary transverse sectional view taken as indicated at 2—2 on Fig. 1, showing one of a set of locking pawl mechanisms or devices hereof.
Fig. 3 is a fragmentary, reduced scale, detail view taken in the direction indicated at 3—3 adjacent Fig. 1.
Fig. 4 is a fragmentary view corresponding generally to Fig. 1, showing modified form of the invention.

The herewith illustrated spring clutch assembly C (Figs. 1 through 3 hereof) is quite similar to that of our application Serial No. 427,742 filed May 5, 1954, the spring clutch hereof, as in said application, being especially adapted for use in driving a gas compressor on an internal combustion engine driven vehicle. A small portion of the compressor housing is indicated in Fig. 1 by broken lines L. The compressor has an input shaft S, partially shown, and the clutch (assembly C) hereof is supported on the free end of shaft S. The input or driving member of clutch C is shown as a pulley wheel 1 adapted to be driven by the engine fan belt, not shown, which turns the engine fan and the pulley 1 (position of fan partially indicated at F) so long as the engine is being operated. The output or driven element of the clutch C is shown in the form of a shaft adapter 2 suitably attached to shaft S. An axial, generally cylindrical, pocket 4 in the shaft adapter 2 contains the free end coils of helical clutch spring 5. The opposite "anchored" end of the clutch spring, as shown, is tightly secured in an internal drum portion 1a of a disc member or section 6 of pulley 1 by a split metallic ring 7 which, in effect, tightly clamps several of the anchored end coils against drum surface 1a. The pulley 1 is supported for rotation relative to the shaft S on a more or less conventional ball bearing assembly 8 surrounding the shaft adapter 2 and supported by it. The free end coils of clutch spring 5 which extend into the pocket 4 of the adapter 2 are (as illustrated) normally out of contact with the internal clutch drum surface 4a in the annular pocket of adapter 2. Those normally disengaged coils of the clutch spring are energized into one-way-driving, locking contact with internal drum surface 4a by an actuator or energizer sleeve 9 which is slidably mounted on the adapter 2, for operation by load resistance torque, being prevented from turning relative to the adapter 2 by a pin 10 fixed in the adapter as clearly evident.

The actuator sleeve 9, as shown, has a tab or lug 9a which is moved by springs 11 (bearing axially on the actuator sleeve) into the plane of rotation of the endmost free coil of the clutch spring 5, thereby to initiate expansion of the clutch spring. Expansion of the clutch spring 5 into gripping or locking contact with clutch drum surface 4a takes place when a control lever 12 (portion of lever shown bearing against an axial end cap 13 of the actuator sleeve) is moved to the right from its illustrated position. In order to transmit the necessary torque in the indicated direction (see arrow on shaft 8, Fig. 1) the clutch spring 5 is right hand wound. It will be evident from the above that the one-way-torque-transmitting gripping operation of the clutch spring 5, depends upon more or less steady or uniform resistance to rotation on part of load-connected shaft S to which the actuator sleeve 9 is in effect keyed.

In the spring clutch construction as thus far described, cyclic or rapidly recurrent overrun of the compressor drive shaft, hence adapter 2, relative to the power input pulley wheel 1 temporarily removes the energizing force normally being applied to the clutch spring 5 through load-connected actuator sleeve tab 9a. As little as 3° of angular relative motion, involved in such cyclic overrun, will intermittently release or unlock the clutch spring from its coacting drum or drums (i. e. at the "crossover" region designated 15 Fig. 1 in the illustrated double drum type of spring clutch).

The centrifugally responsive mechanism hereof operates, (during power transmission through the spring clutch at speeds such that cyclic disengagement and re-engagement of the clutch spring would then be detrimental to the clutch), to prevent the clutch spring from moving out of locking contact with its coacting drum or drums; and (at relative speeds sufficiently low so that such cyclic action would not be detrimental) automatically frees the clutch spring from restraint and does not interfere in any manner with proper control of the clutch, e. g. by an operator at desired times. For compressor drive service the centrifugally responsive elements can, for example, by appropriate design, be arranged to perform their antirotational function only in a speed range from maximum to a fairly low idling speed on part of the engine.

As shown in Figs. 1 to 3 hereof, the output element (adapter 2) of the clutch mechanism C has one or more (four for example) pawls 20 freely pivoted thereto, as on pins 21 parallel to the axis of shaft S, arranged for movement, in response to variations in centrifugal force, into and out of circumferential registry with respective shoulders 22 on the input element (pulley 1) of the clutch mechanism. Radial outward movement of the pawls is resisted by light springs of substantially identical effective scale. One of these is shown in Fig. 2 as a cantilever leaf spring 24 attached to shaft adapter 2 and having an arm portion outwardly overlying and bearing inwardly upon the associated pawl 20. The shoulders 22, one shown, are formed on an annular rim section 16 of pulley wheel 1 (see Fig. 1) which section is angularly adjustable in infinitely small increments relative to the section 6 of the pulley to which the clutch spring 5 is anchored as previously described.

Provision for precise angular adjustment (see Fig. 3) between pulley wheel sections 6 and 16 comprises a series of equally spaced circumferential slots 17 in pulley section 6 (one slot shown) and associated clamping screws 18, each threaded into an opening 19 of section 16. There are twice as many equally spaced threaded openings 19 as there are slots 17; and the slots are coextensive with any two adjacent openings 19. That relationship, during assembly, enables relative angular adjustment of the sections 6 and 16 through any desired total angle. Thus, with the clutch spring 5 fully expanded during assembly of the clutch C (done for example manually, the shoulders 22 of pulley rim section 16 can be located and set so as to clear the nose surfaces 20' of pawls 20 by any desired minute distance when the pawls are later swung radially outwardly by centrifugal force during operation of the above described mechanism.

Manufacturing tolerances in clutch spring and drum diameters and other dimensions would make it extremely difficult, if not practically impossible, properly to locate the locking shoulders 22 relative to the pawl ends 20' in case no such adjustment as above described were provided. In order to minimize frictional restraint against swinging of the pawls 20, the shank ends of the pawls abut respective rigid circumferentially facing shoulders 25, formed on the adapter 2, when the pawls and shoulders 22 are brought together with substantial force in resisting uncoiling movement of clutch spring 5 such as would permit overrunning operation of the clutch C. Thus the pivot pins 21 can be of small diameter and can somewhat loosely occupy the holes therefor in the pawls 20.

In operation, assuming the above described adjustment has been properly made and that the clutch spring 5 has been energized at some low relative speed of the input and output clutch members 1 and 2 or at standstill, the indicated rotation of the input member 1, Fig. 2, will cause locking up of the spring clutch elements 5, 4a etc. while the pawls 20 and shoulders 22 are in such angular relative position that the pawl ends 20' can be certain of clearing the shoulders 22 by a substantial, though small, distance if and when the pawls 20 are moved radially outwardly. Thus when, at higher rotational speeds of the coupling, intermittent overrunning of the shaft S and adapter 2 relative to the pulley 1 and its connected clutch spring 5 tends to occur, the overrunning is limited (by the outwardly swung pawls 20 in abutment with shoulders 22) to less angular relative movement of the actuator tab 9a and the free end of clutch spring 5 abutted thereby than will release the main coils of the clutch spring (adjacent crossover 15) from fully expanded, hence locking, position on the coacting drum surfaces.

In the arrangement according to Fig. 4 an auxiliary helical clutch spring 30 (in lieu of pawls 20 etc.) is suitably anchored to the shaft adapter 2' at one end (left end, as shown), and the free end coils of the clutch spring surround and normally are radially supported on an external peripheral surface 31 formed on a flange portion 32 of the shaft adapter. The drive pulley 1' can be made in one section in this case, and is so shown. Auxiliary clutch spring 30 is wound reversely of main clutch spring 5 and has its mass and coil flexibility so chosen and interrelated that, under predetermined speed conditions such as already described, the free end (rightward) coils of clutch spring 30 automatically expand into one-way-locking frictional contact with an internal drum surface 34 formed in the pulley 1'. Drum surface 34 lies radially close to the initial or normal position of the outer peripheral surfaces of the free end coils of clutch spring 30. One known manner of increasing flexibility of spring clutch energizing coils without materially reducing mass is to form a series of slots in the coils. Slots are shown or suggested at 35 in the last few free end coils of auxiliary clutch spring 30. Thereby the sensitivity of clutch spring 30 to centrifugal force is increased without having to sacrifice coil cross section at the "crossover" regions of the internal clutch drums where the maximum clutching pressures occur. Except as noted above, the construction according to Fig. 4 corresponds to Fig. 1.

We claim:

1. In a torque transmitting coupling of the type employing a helical coil friction element and a coacting drum arranged for frictional engagement by the coil element to transmit a substantial amount of torque in one rotational direction only through the coupling, the drum, consequent upon occurrence of a predetermined amount of angular relative movement of the coil and drum, being capable of overrunning relative to the coil in said direction, centrifugally operable means yieldingly biased toward inactive position, said means, at a predetermined rotational speed of the coupling and in response to centrifugal force, operating to lock the coil element and drum against sufficient relative angular movement to permit overrunning.

2. In a torque transmitting coupling, two coaxial relatively rotatable members, a circular clutch drum surface connected always to turn with one member, a helical clutch spring connected always to turn with the other member and arranged to grip the drum surface and prevent relative angular movement of said members in one direction only, centrifugally operable locking means spring biased toward inoperative position, said locking means being connected always to turn with said one member and being movable radially of the common axis of the members by centrifugal force to operative position, and coacting surface means connected always to turn with said other member and engageable by the locking means in its said operative position in a direction to prevent relative movement of said members in the opposite direction only.

3. In a spring clutch mechanism, a driving or input element for connection with a power source, a coaxial driven or output element for connection with a load, a circular drum surface on one of said elements, a helical clutch spring secured to turn with the other element, the spring being normally free from the drum surface but arranged to grip it in a manner to transmit torque to the output element, torque transmitting means connected for operation by normal resistance of the load to turning, said means being arranged to act upon the clutch spring and being settable from a point externally of the mechanism in a manner selectively to render the mechanism active to transmit torque in one rotational direction and inactive, and centrifugally actuatable means including two normally separated interengageable members carried respectively by the input and output elements and relatively movable into operating engagement by centrifugal force in a manner to block overrunning of the output element relative to the input element in said rotational direction while said first named means is operating to render the clutch mechanism active.

4. In a torque transmitting coupling, two coaxial relatively rotatable members, an overrunning spring clutch mechanism arranged to connect the members for transmission of torque by the coupling in one rotational direction only, a centrifugally operable locking pawl and spring means acting thereon tending to move the pawl toward inoperative position, said locking pawl being connected always to turn with one of said members and being movable radially of the common axis of the members by centrifugal force to operative position, and coacting shoulder surface means connected always to turn with the other of said members and circumferentially engageable by the locking pawl in its said operative position in a direction opposing overrunning of the spring clutch mechanism.

5. The coupling according to claim 4 wherein the member to which the pawl is connected comprises two rigid sections which are relatively angularly adjustable in small increments about the common axis of the members through approximately 360°, and means to lock the sections in relatively adjusted position, and the spring clutch mechanism has an energizing means which renders the clutch active to transmit torque in approximately one angular relationship only of said relatively rotatable members about said axis.

6. In a torque transmitting coupling, two coaxial relatively rotatable members, an overrunning spring clutch mechanism arranged to connect the members for transmission of torque by the coupling in one rotational direction only, an overrun preventing auxiliary spring clutch mechanism arranged to connect the members for transmission of torque in the opposite rotational direction only, said auxiliary mechanism including a coil connected always to turn with one of said members, and an internal circular drum connected always to turn with the other of said members and frictionally engageable by said coil at a predetermined speed of rotation of the coil-connected member.

7. In a torque transmitting coupling of the type employing a helical coil friction element and a coacting drum arranged for frictional engagement, by coiling movement of the coil element toward the drum, to transmit a substantial amount of output torque in one rotational direction only through the coupling torque transmitting means operated by load resistance torque and connected to act on the coil element during transmission of torque by the coupling to hold the coil in gripping relationship to the drum, and centrifugally operable means yieldingly biased toward inactive position, the latter means, at a predetermined rotational speed of the coupling and in response to centrifugal force, operating to lock the coil element against uncoiling movement sufficient to permit overrunning of the coupling.

References Cited in the file of this patent
UNITED STATES PATENTS

| | | |
|---|---|---|
| 2,038,450 | Roesch | Apr. 21, 1936 |
| 2,081,838 | Racklyeft | May 25, 1937 |
| 2,663,397 | Scott | Dec. 22, 1953 |
| 2,678,117 | Birbaum | May 11, 1954 |